3,536,369
APPARATUS AND METHOD FOR CHANGING OPERATED SHAFT SUPPORT SYSTEM CHARACTERISTICS
Richard Ainsworth, Huntington, and Robert E. Johnson, Stepney, Conn., assignors to Avco Corporation, Stratford, Conn., a corporation of Delaware
Filed Oct. 21, 1968, Ser. No. 769,004
Int. Cl. F16c 13/06
U.S. Cl. 308—189                                     15 Claims

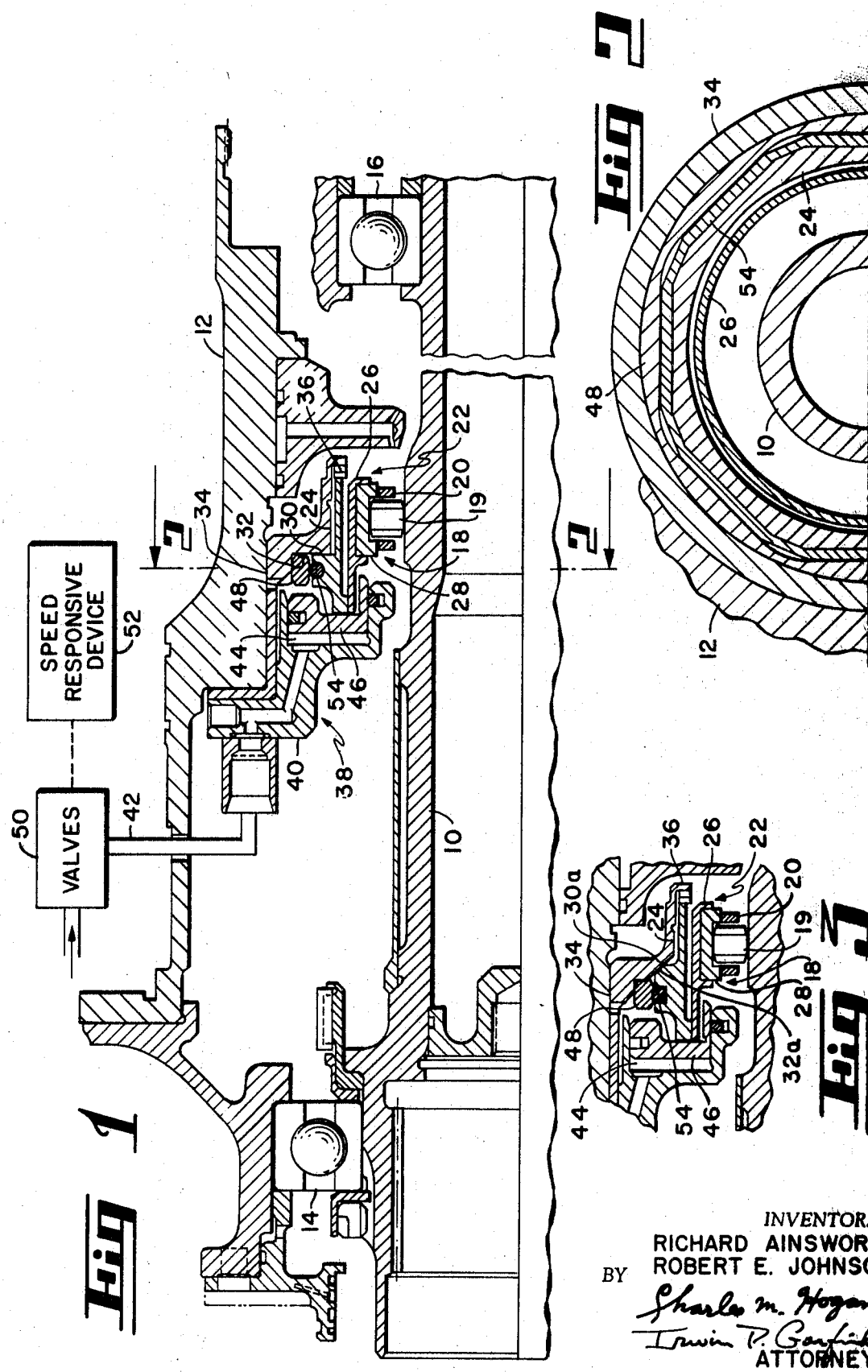

ABSTRACT OF THE DISCLOSURE

A shaft is normally supported between two bearings. A third bearing, redundant except during certain critical speed ranges, is grounded by a hydraulically operated piston to provide a third bearing support for the shaft.

BACKGROUND OF THE INVENTION

In the operation of a relatively long high speed shaft there are normal critical speed ranges at which the shaft may vibrate excessively. To avoid the problems encountered at the critical shaft speeds, the shaft is supported at an intermediate point by a third normally redundant bearing, that is, except at the normal critical speed ranges the third bearing is ungrounded and provides no support for the shaft. However, at a critical speed range the bearing is grounded to provide a three-point bearing support which changes the critical speed of the shaft. This results from the fact that a shaft of any given length supported at two points will have different critical speeds than the same shaft supported at three points.

THE OBJECTS

It is an object of this invention to provide an intermediate bearing for a relatively long high speed shaft normally supported between two bearings and having normal critical speed ranges when supported by said two bearings, said intermediate bearing providing support only at or through said normal critical speed ranges.

THE DRAWINGS

FIG. 1 is a cross-sectional view of an embodiment of this invention;

FIG. 2 is a cross-sectional view taken through the line 2—2 of FIG. 1 illustrating the antirotational device shown in FIG. 1; and FIG. 3 is a cross-sectional view of a second embodiment of this invention.

DESCRIPTION OF THE FIRST EMBODIMENT

Referring to the drawings, a relatively long shaft 10 is rotatably mounted within a stationary housing 12 between conventional bearings 14 and 16. During normal operation the shaft 10, when supported by the bearings 14 and 16, has given critical speed ranges. In a particular example the shaft 10 had a first critical speed at approximately 10,000 r.p.m. and a second critical speed at 40,000 r.p.m. In order to avoid excessive and possibly damaging vibration when accelerating through, or operating at the critical speed, an intermediate roller bearing 18 is provided. When the bearing 18 is grounded, the first critical speed of the shaft was changed to 20,000 r.p.m. and the second critical speed to 65,000 r.p.m. It the normal operating speed was less than 20,000 r.p.m., the three-bearing support system would allow safe operation. However, if the normal operating speed was greater than 20,000 r.p.m. but less than 40,000 r.p.m., it would be necessary to operate the shaft between the first and second critical speeds of a two-bearing support system. To safely traverse the first critical speed at 10,000 r.p.m., the third bearing is introduced. At a speed above 10,000 r.p.m. but below 20,000 r.p.m., the third bearing support is removed and the shaft operates on two bearing supports. It is apparent that with means to introduce an additional support and thereby change the critical speed of a shaft system, numerous critical speed ranges can be traversed by successive introduction of, or removal of the third bearing support.

The roller bearing 18 is composed of rolling elements 19, a cage 20, and an outer raceway 28. A bearing retainer assembly 22 is fabricated of three parts fastened together. These parts include a clamping member 24 from which a support member 26 is cantilevered. The outer race 28 of the bearing 18 is secured to the end of the support member 26.

The clamping member 24 is provided with an annular face 30 which, in the position shown, is in face contact with the complementary annular surface 32 formed in a housing member 34 affixed to the inner periphery of the housing 12. It will be noted that there is clearance between the bearing 18 and the housing member 34 so that there is no radial connection between the bearing and the housing. The housing member 34 is formed to provide an annular retainer for a spring 36 which applies an axial force to the clamping member 24 tending to maintain the faces 30 and 32 out of contact. Therefore, during normal operation the bearing assembly 22 is not connected to the housing and the bearing 18 provides no support for the shaft.

A piston assembly generally indicated at 38 is provided for the purpose of driving the face 30 of the clamping member 24 into contact with the face 32 of the housing member 34. The piston assembly 38 includes a housing 40 having hydraulic inlet ports 42 communicating with a piston cylinder 44 in which a piston 46 is slidably positioned. When hydraulic fluid is applied under pressure to the inlet ports 42, the piston 46 is driven against the bearing retainer assembly 22, driving the face 30 into firm contact with the face 32. This action serves to effectively connect the bearing retainer assembly 22 to the housing member 34 and thereby introduces the bearing 18 into the supporting system of the shaft 10. Hydraulic fluid pressure is supplied from a source (not shown) through a valve arrangement 50, controlled in response to a speed responsive device 52 controlled by the shaft 10. The function of the valve arrangement 50 and speed device 52 is to provide fluid pressure to the port 42 only when necessary to enter bearing 18 into the shaft support system.

When the bearing retainer is unclamped, it is prevented from rotation by an eight-sided spline 48 and an elastomeric element 54 placed between the spline teeth. The element 54 is restrained axially by the clamping member 24.

DESCRIPTION OF THE SECOND EMBODIMENT

The second embodiment of the invention is shown in FIG. 3, wherein identical elements are shown with the same reference characters and similar elements are distinguished by the suffix a.

In the embodiment of FIG. 1 the bearing 18 was clamped by applying an axial force between the annular faces 30 and 32 of the bearing assembly 22 and the housing member 34, respectively. The embodiment of FIG. 3 differs from the embodiment of FIG. 1 in that annular faces 30a and 32a are conical, and thus inclined at an angle with respect to the shaft axis so that the application of pressure on the assembly 22 produces a wedging action between the faces 30a and 32a. This results in a positive clamping action on the bearing since the forces Many variations and adaptations will be apparent to persons skilled in the art, and it is intended therefore that this invention be limited only by the following claims as interpreted in the light of the prior art.

We claim:

1. In a system for supporting a high speed rotating shaft having a predetermined critical speed range, the combination comprising:
   an annular housing;
   first and second axially spaced bearings supporting said shaft for rotation within said housing;
   an intermediate bearing between said spaced bearings, said intermediate bearing being maintained in an annular bearing support positioned within said housing, said bearing support being normally disconnected from said housing, whereby said intermediate bearing normally provides no support for said shaft; and
   means for rigidly connecting said support to said housing in response to said predetermined critical speed range of said shaft, whereby said shaft is supported by said intermediate bearings during said speed range.

2. The invention as defined in claim 1 wherein said housing and said annular bearing support each have an annular face, said faces being complementary and normally spaced, said support being axially movable, whereby said faces contact; and
   wherein said means for rigidly connecting said support to said housing comprises means for axially moving said support into face pressure contact with said face on said housing during said speed range.

3. The invention as defined in claim 2 wherein said annular faces lie in planes perpendicular to the axis of rotation of said shaft, whereby the connection of said support to said housing results from the friction between said faces.

4. The invention as defined in claim 3 wherein said bearing support includes an annular structure, said annular face being on said annular structure, a bearing retainer for retaining said intermediate bearings and a support mechanically interconnecting said bearing retainer and said annular structure.

5. The invention as defined in claim 4, and spring means between said annular housing and said annular bearing support means for axially urging said annular complementary faces out of contact.

6. The invention as defined in claim 5 wherein said means for axially moving said support into face contact with said face on said housing during said speed range comprises a hydraulically actuated piston.

7. The invention as defined in claim 6, and restraining means for restraining rotation of said support.

8. The invention as defined in claim 7 wherein said restraining means comprises a metallic ring splined to said housing, and an elastomeric ring compressed between said metallic ring and said support.

9. The invention as defined in claim 2 wherein said faces are conical whereby the connection of said support to said housing results at least in part from a wedging action between said faces.

10. The invention as defined in claim 9 wherein said bearing support includes an annular structure, said annular face being on said annular structure, a bearing retainer for retaining said intermediate bearings and a support mechanically interconnecting said bearing retainer and said annular structure.

11. The invention as defined in claim 10, and spring means between said annular housing and said annular bearing support means for axially urging said annular faces out of contact.

12. The invention as defined in claim 11 wherein said means for axially moving said support into face contact with said face on said housing during said speed range comprises a hydraulically actuated piston.

13. The invention as defined in claim 12 wherein said faces lie in planes at an angle to the axis of rotation of said shaft, whereby the connection of said support to said housing results in part from a wedging action between said faces.

14. The invention as defined in claim 13, and restraining means for restraining rotation of said support.

15. The invention as defined in claim 14 wherein said restraining means comprises a metallic ring splined to said housing, and an elastomeric ring compressed between said metallic ring and said support.

References Cited
UNITED STATES PATENTS 2,961,277   11/1960   Sternlicht _____ 308—78

FRED C. MATTERN, Jr., Primary Examiner

F. SUSKO, Assistant Examiner

PO-1050
(5/69)

UNITED STATES PATENT OFFICE
CERTIFICATE OF CORRECTION

Patent No. 3,536,369        Dated October 27, 1970

Inventor(s) Richard Ainsworth and Robert E. Johnson

It is certified that error appears in the above-identified patent and that said Letters Patent are hereby corrected as shown below:

Title of patent should be "Apparatus and Method for Changing Operating Shaft Support System Characteristics" instead of "Apparatus and Method for Changing Operated Shaft Support System Characteristics."

Column 1, line 66, "It" should read --- If ---.

SIGNED AND
SEALED
DEC 29 1970

(SEAL)
Attest:

Edward M. Fletcher, Jr.
Attesting Officer

WILLIAM E. SCHUYLER, JR.
Commissioner of Patents